(12) United States Patent
Komazawa

(10) Patent No.: US 12,260,135 B2
(45) Date of Patent: Mar. 25, 2025

(54) INFORMATION PROCESSING DEVICE, PRINTING SYSTEM, AND NON-TRANSITORY COMPUTER READABLE MEDIUM FOR PREVENTING LEAKAGE OF CONFIDENTIAL DATA CONTAINED IN PRINT DATA

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 304 days.

(21) Appl. No.: 17/697,931

(22) Filed: Mar. 18, 2022

(65) Prior Publication Data

US 2023/0062008 A1 Mar. 2, 2023

(30) Foreign Application Priority Data

Sep. 2, 2021 (JP) ................. 2021-142975

(51) Int. Cl.
*G06F 3/12* (2006.01)
(52) U.S. Cl.
CPC .......... *G06F 3/1222* (2013.01); *G06F 3/1226* (2013.01); *G06F 3/1238* (2013.01)

(58) Field of Classification Search
None
See application file for complete search history.

(56) References Cited

U.S. PATENT DOCUMENTS

2016/0277637 A1\* 9/2016 Matsui ................. G06V 30/413

FOREIGN PATENT DOCUMENTS

| JP | 2019139538 | | 8/2019 |
| JP | 2019139538 | A \* | 8/2019 |

\* cited by examiner

*Primary Examiner* — Andrew H Lam
(74) *Attorney, Agent, or Firm* — JCIPRNET

(57) ABSTRACT

An information processing device includes a processor configured to: recognize, based on a predetermined condition, a degree of confidentiality of acquired print data; request a first apparatus that is installed in an internal environment in which the first apparatus is installed or that is installed in an environment that requires authentication processing for access to perform rasterization processing on print data that is recognized as having a high degree of confidentiality; and request a second apparatus, which is different from the first apparatus, to perform rasterization processing on print data that is recognized as not having a high degree of confidentiality.

20 Claims, 12 Drawing Sheets

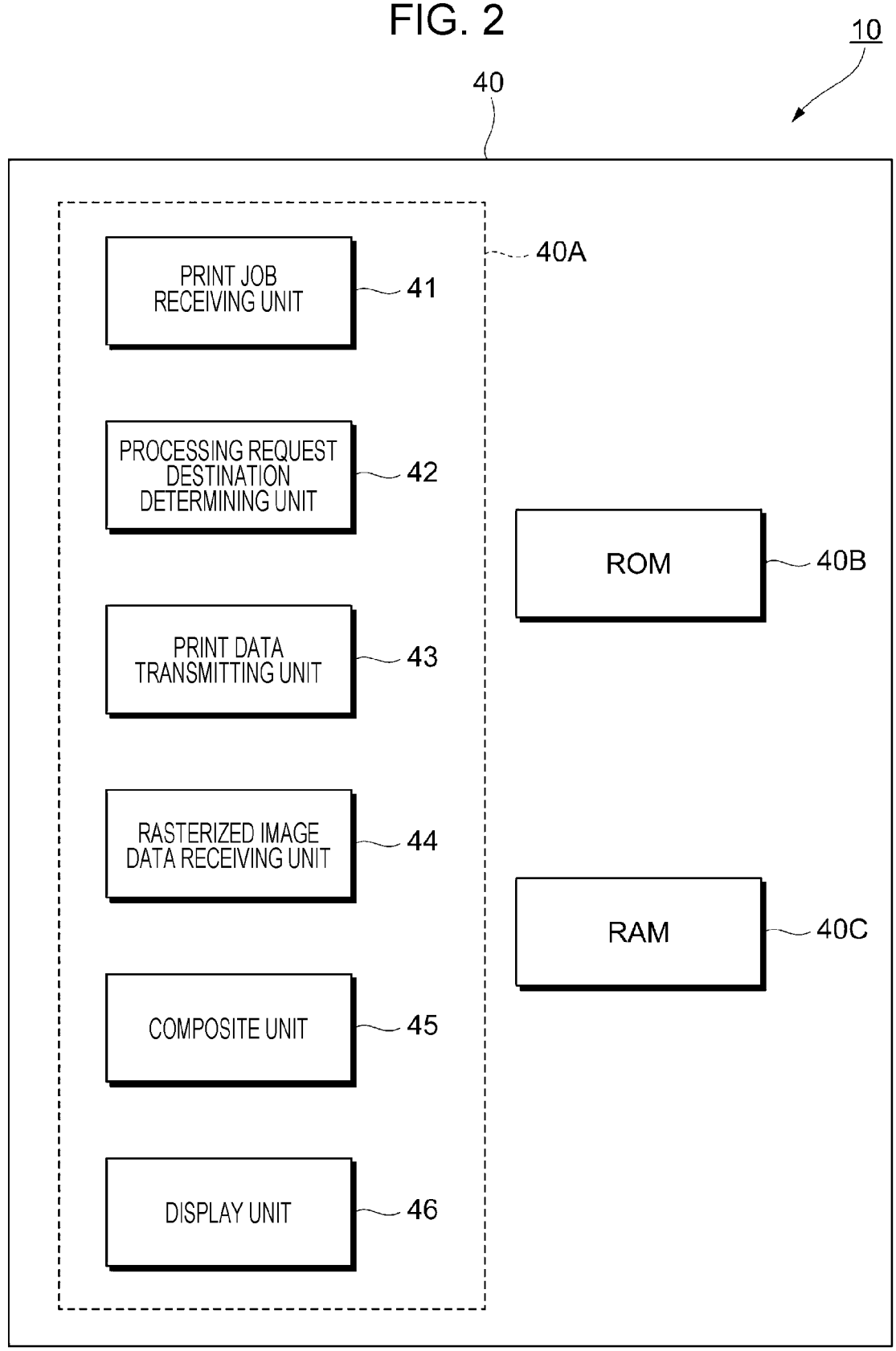

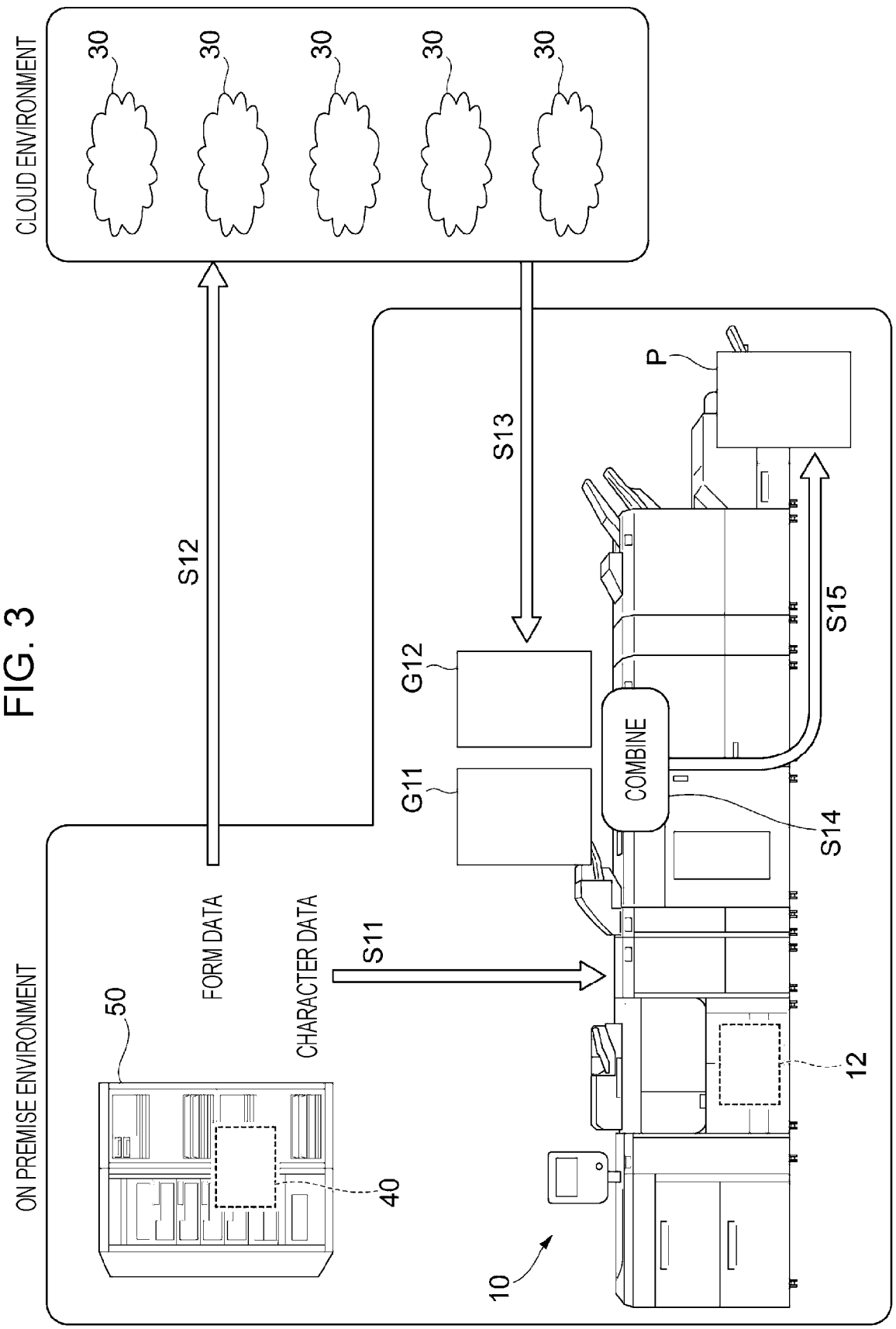

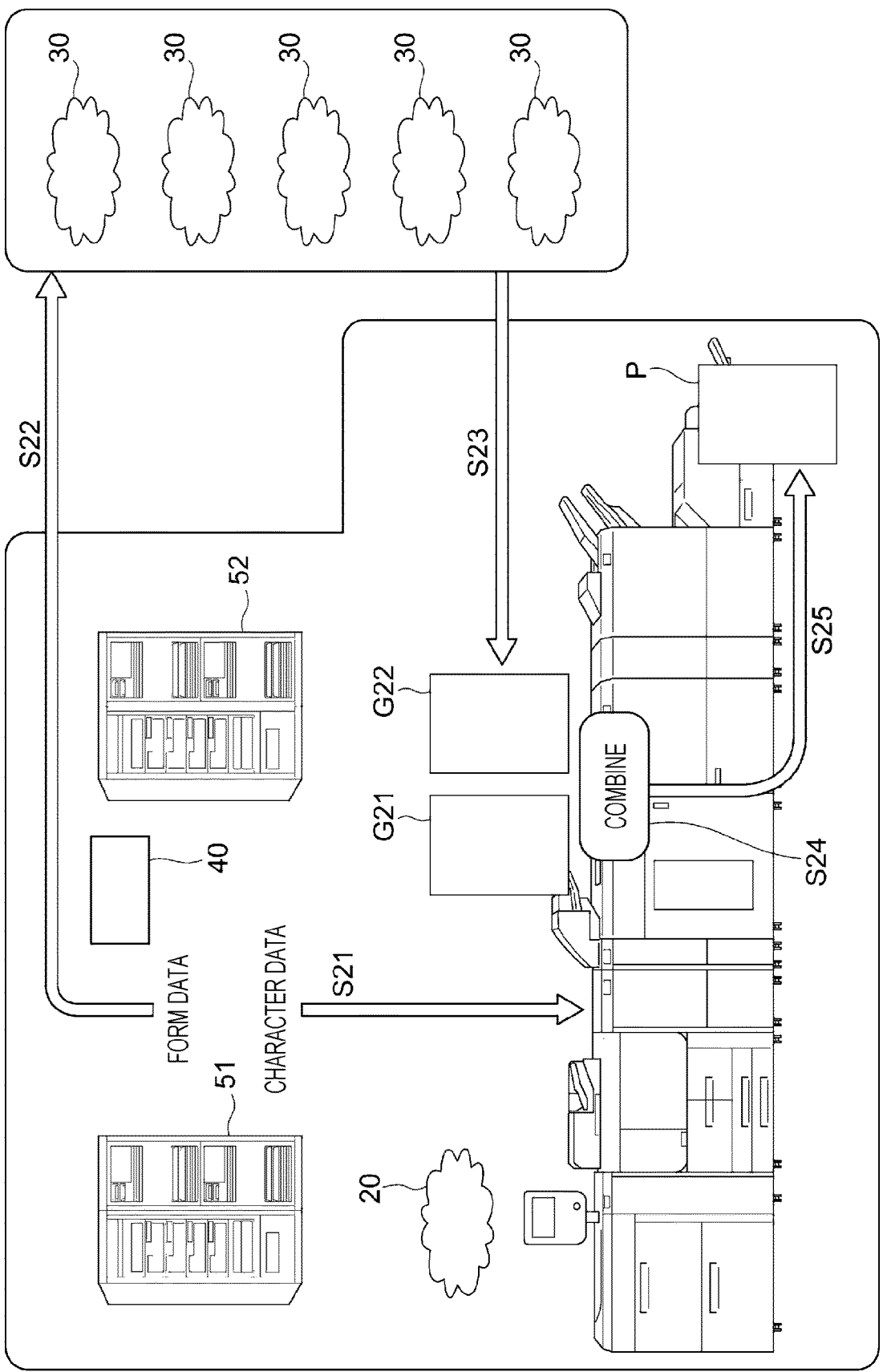

FIG. 5

| SETTING OF RASTERIZATION | | | 61a |
|---|---|---|---|

☑ RASTERIZE SECURITY DATA IN DISTRIBUTED MANNER — 61b

LIST OF SECURITY APPROVED SERVERS — 61c

| NAME | ADDRESS | | |
|---|---|---|---|
| raster-service1 | xxx xxx xxx xxx | | |
| raster-service2 | xxx xxx xxx xxx | | |
| raster-service3 | xxx xxx xxx xxx | | |
| | | | |

[ADD] [EDIT] [DELETE]

LIST OF SECURITY DISAPPROVED SERVERS — 61d

| NAME | ADDRESS | | |
|---|---|---|---|
| raster-public1 | xxx xxx xxx xxx | | |
| raster-public2 | xxx xxx xxx xxx | | |
| raster-public3 | xxx xxx xxx xxx | | |
| | | | |

[ADD] [EDIT] [DELETE]

[CLOSE (C)]

61

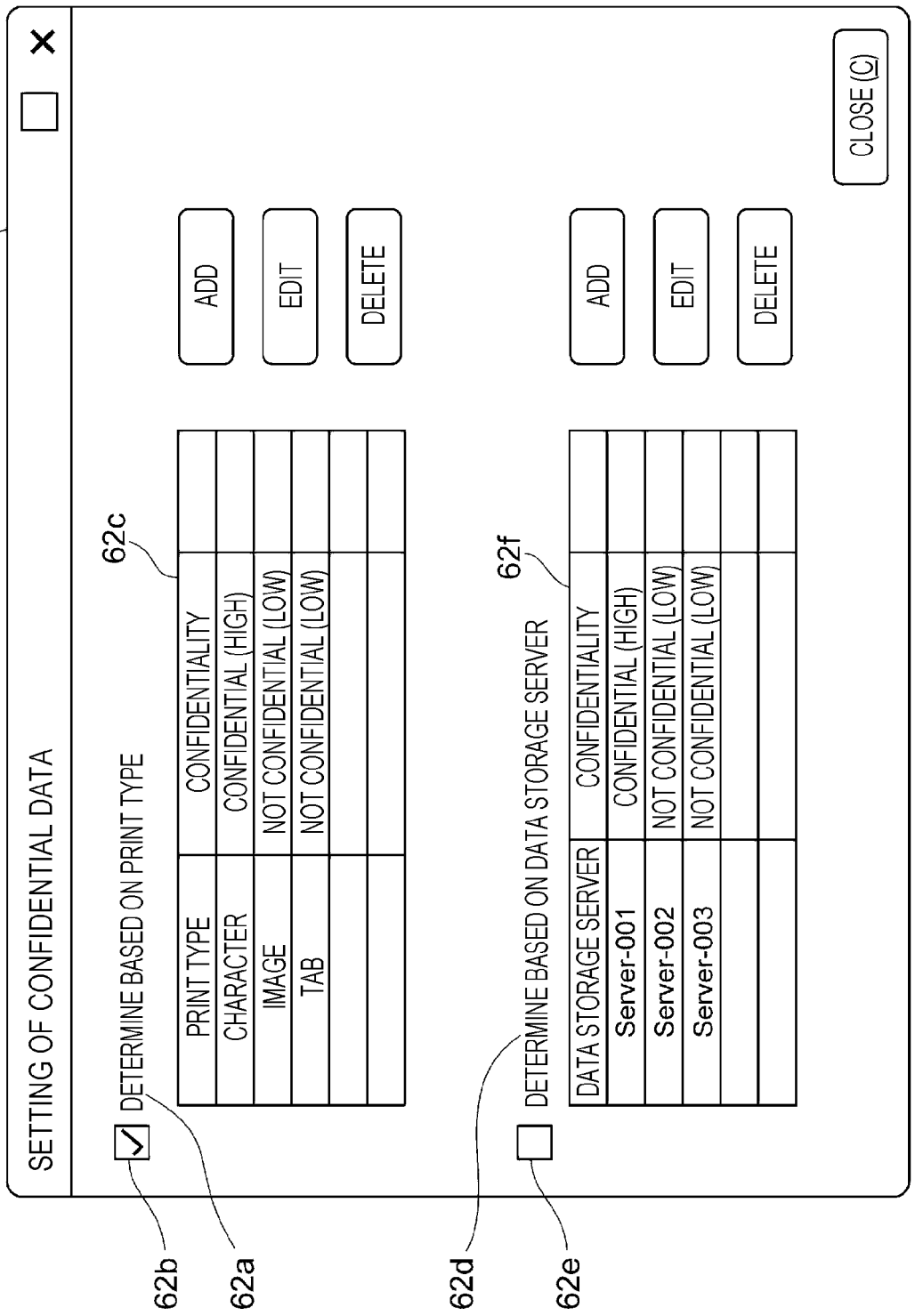

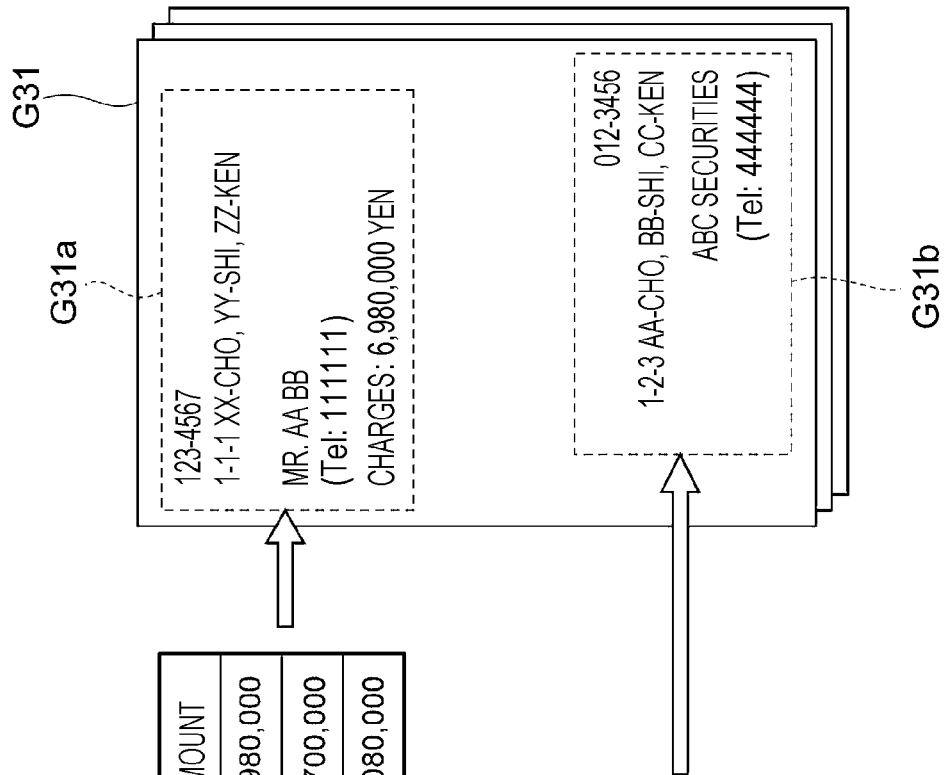

| NAME | ADDRESS | PHONE NUMBER | AMOUNT | COMPANY NAME | ADDRESS | PHONE NUMBER |
|---|---|---|---|---|---|---|
| AA BB | 1-1-1 XX-CHO, YY-SHI, ZZ-KEN | 111111 | 6,980,000 | ABC SECURITIES | 1-2-3 AA-CHO, BB-SHI, CC-KEN | 444444 |
| BB CC | 2-2-2 YY-CHO, ZZ-SHI, XX-KEN | 222222 | 700,000 | ABC SECURITIES | 1-2-3 AA-CHO, BB-SHI, CC-KEN | 444444 |
| CC AA | 3-3-3 ZZ-CHO, XX-SHI, YY-KEN | 333333 | 19,080,000 | ABC SECURITIES | 1-2-3 AA-CHO, BB-SHI, CC-KEN | 444444 |

73a — columns: NAME, ADDRESS, PHONE NUMBER, AMOUNT
73b — columns: COMPANY NAME, ADDRESS, PHONE NUMBER

INFORMATION PROCESSING DEVICE, PRINTING SYSTEM, AND NON-TRANSITORY COMPUTER READABLE MEDIUM FOR PREVENTING LEAKAGE OF CONFIDENTIAL DATA CONTAINED IN PRINT DATA

CROSS-REFERENCE TO RELATED APPLICATIONS

This application is based on and claims priority under 35 USC 119 from Japanese Patent Application No. 2021-142975 filed Sep. 2, 2021.

BACKGROUND

(i) Technical Field

The present disclosure relates to an information processing device, a printing system, and a non-transitory computer readable medium.

(ii) Related Art

An order system including an information processing system is disclosed in, for example, Japanese Unexamined Patent Application Publication No. 2019-139538. The information processing system includes a customer database that stores a plurality of customer records containing confidential information. The information processing system performs filtering processing for excluding at least confidential information from a customer record, and stores the customer record not including the confidential information into an analyzing database. The information processing system receives designation information for designating a plurality of customer records contained in the customer records, and specifies a customer record as an order target from among the customer records containing the confidential information.

SUMMARY

If an image forming apparatus is configured to print an image that has been rasterized by an information processing device, the productivity of printing may be increased compared to the case where the image forming apparatus performs rasterization of print data. However, if the print data is highly confidential, it might be difficult to guarantee the confidentiality of the print data depending on the environment where the information processing device that performs rasterization processing is installed.

Aspects of non-limiting embodiments of the present disclosure relate to increasing the productivity of printing and preventing leakage of highly confidential data contained in print data, compared to a case where rasterization processing is performed only in an on premise environment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: recognize, based on a predetermined condition, a degree of confidentiality of acquired print data; request a first apparatus that is installed in an internal environment in which the first apparatus is installed or that is installed in an environment that requires authentication processing for access to perform rasterization processing on print data that is recognized as having a high degree of confidentiality; and request a second apparatus, which is different from the first apparatus, to perform rasterization processing on print data that is recognized as not having a high degree of confidentiality.

BRIEF DESCRIPTION OF THE DRAWINGS

Exemplary embodiments of the present disclosure will be described in detail based on the following figures, wherein:

FIG. 2 is a functional block diagram of a printer;

FIG. 3 is a diagram for explaining a first example as a processing example for the case where a printing instruction based on a print job is issued;

FIG. 4 is a diagram for explaining a second example as a processing example for the case where a printing instruction based on a print job is issued;

FIG. 5 is a diagram for explaining a UI screen for setting of rasterization in the second example;

FIG. 6 is a diagram for explaining a UI screen for setting of confidential data in the second example;

FIGS. 7A and 7B are diagrams for explaining character data in the second example, FIG. 7A indicating character data, FIG. 7B indicating recording media on which the print data illustrated in FIG. 7A is printed;

FIG. 8 is a diagram for explaining the character data in the second example;

DETAILED DESCRIPTION

Hereinafter, exemplary embodiments of the present disclosure will be described with reference to the attached drawings.

Figure 1:
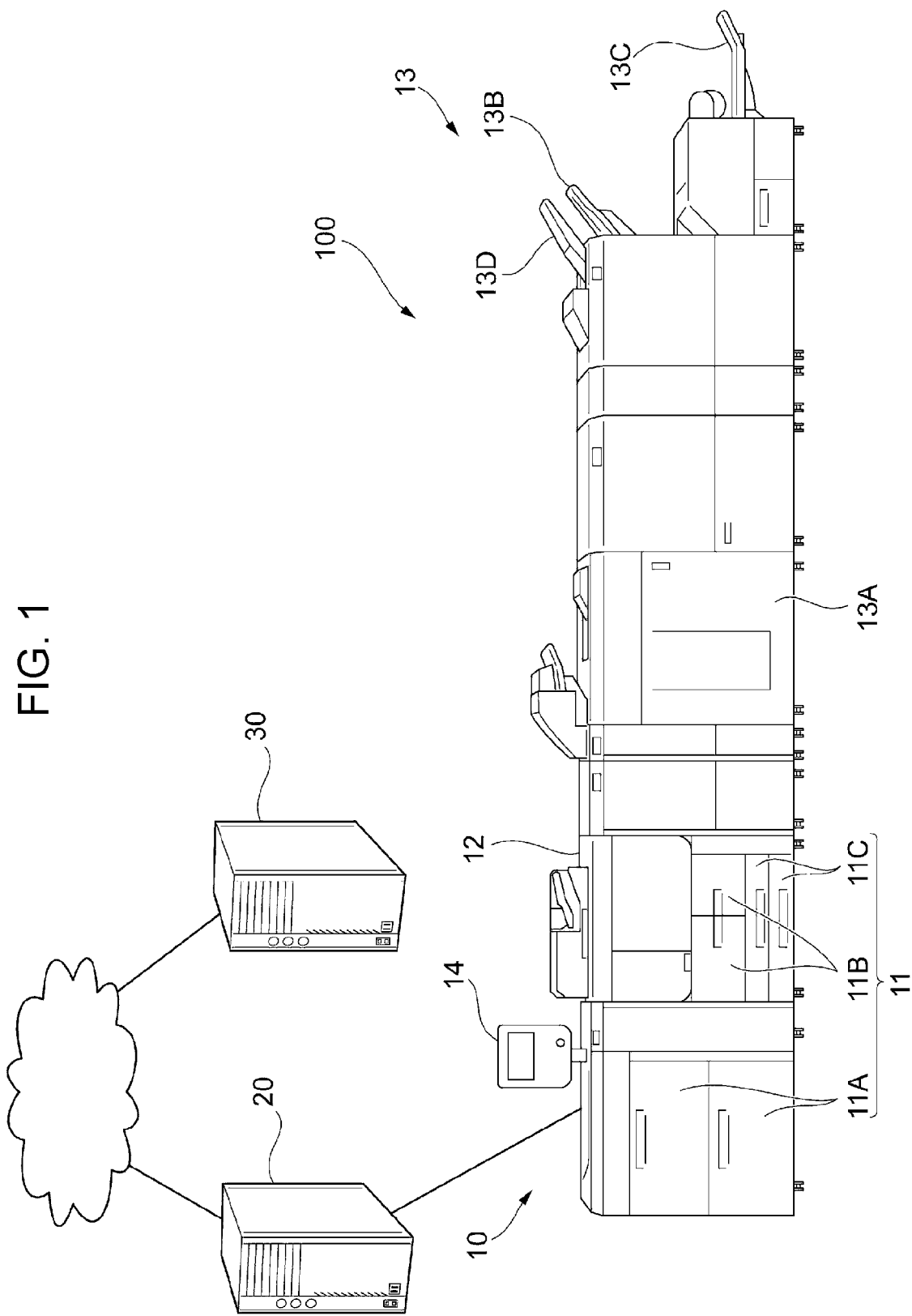
FIG. 1 is a diagram for explaining a configuration of a printing system.

FIG. 1 is a diagram for explaining a configuration of a printing system 100.

The printing system 100 illustrated in FIG. 1 includes a printer 10 that performs printing on paper. The printer 10 is connected to server apparatuses 20 and 30 so that the printer 10 is able to communicate with the server apparatuses 20 and 30.

The printer 10 prints an image on paper, which is an example of a recording medium, based on an acquired print job. The "print job" represents a processing unit of a printing operation instructed by a single printing instruction.

The printer 10 is, for example, a so-called production printer used for commercial printing and has a function capable of performing high-image-quality and high-speed printing processing. Furthermore, the printer 10 has a function capable of performing, in accordance with a printing instruction, postprocessing on paper on which an image is printed. The "postprocessing" represents, for example, processing for binding a paper bundle, processing for folding paper, processing for cutting paper, bookbinding, and the like.

The printer 10 is not limited to a production printer and may be a typical printer (a business printer, a home printer, or the like).

The printer 10 includes a paper feed unit 11 that feeds paper on which printing is to be performed, a printing unit 12 that prints paper fed by the paper feed unit 11, a plurality of ejection destinations 13 to which printed paper is ejected, and an operation display unit 14 to be operated by a user.

The paper feed unit 11 includes a plurality of paper feed trays 11A, 11B, and 11C that feed paper. The paper feed trays 11A, 11B, and 11C are capable of feeding paper of the same size or different sizes.

For example, the printing unit 12 may be of an electrophotographic system that transfers toner that has been attached to a charged and exposed photoreceptor to a recording material and fixes and forms an image onto the recording material or may be of an inkjet system that discharges ink onto a recording material and forms an image onto the recording material.

The printing unit 12 is configured to be capable of executing double-sided printing for performing printing on both sides of paper. The printing unit 12 may be configured to perform rasterization processing.

In an exemplary embodiment, the plurality of ejection destinations 13 include a stacker tray 13A, a finisher tray 13B, a finisher ejection tray 13C, and an ejection tray 13D. Switching between the stacker tray 13A, the finisher tray 13B, the finisher ejection tray 13C, and the ejection tray 13D (hereinafter, may be referred to as ejection destinations 13 or ejection destinations 13A to 13D) is performed by changing a transport path for printed paper by a driving source in accordance with a printing instruction, and continuous printing is performed. A transport path for paper is formed by a transport roll, a guide plate material, and the like, which are not illustrated in FIG. 1.

The stacker tray 13A, the finisher tray 13B, the finisher ejection tray 13C, and the ejection tray 13D each include a detector, which is not illustrated in FIG. 1, that detects removal of an ejected recording medium. With the detectors, the printing unit 12 is capable of detecting changes in the state of the stacker tray 13A, the finisher tray 13B, the finisher ejection tray 13C, and the ejection tray 13D.

The stacker tray 13A includes a wheeled stacker cart with a pushing handle, and paper is directly ejected to the platform of the stacker cart. Thus, for example, a large amount of paper, such as ten thousand sheets of paper, ejected to the platform of the stacker cart is able to be directly transported without any transfer being made.

The finisher tray 13B has a mechanism for performing binding processing and is capable of binding ejected sheets of paper. The finisher ejection tray 13C has a mechanism for performing binding processing and folding processing and is capable of performing saddle folding/saddle stitching of ejected sheets of paper. The ejection tray 13D is an ejection destination for a small amount of printing.

The operation display unit 14 is configured to include a display part on which various images for operations and various types of information to be notified to a user are displayed and an input part including various buttons to be pressed in accordance with operation images on the display part. The operation display unit 14 may include, for example, a touch panel, as a display screen and the touch panel may have a function as the display part and the input part.

The printer 10 in this exemplary embodiment includes, in addition to the function for printing an image on paper, a function for optically reading an image such as a document and a function for feeding documents one by one to a reading region. The functions of the printer 10 described above are merely examples and may include other functions.

The server apparatuses 20 and 30 are connected to the printer 10 via a network. When receiving a printing instruction via the network, each of the server apparatuses 20 and 30 performs, in accordance with the printing instruction, imposition processing for image data contained in the printing instruction, and then performs rasterization processing. A rasterized image, which has been subjected to rasterization processing, is transferred to the printer 10 and printed and output from the printer 10.

In the case where color printing is designated in a printing instruction, the server apparatuses 20 and 30 may perform imposition processing and color processing in accordance with the printing instruction and then perform rasterization processing.

The printer 10 and the server apparatus 20 are connected via a network such as a local area network (LAN), and the printer 10 and the server apparatus 30 are connected via a network such as the Internet.

The server apparatus 20 has an internal information system inside a company and is located in an on premise environment running in facilities inside the company. That is, the server apparatus 20 is an example of a first apparatus that is installed in an internal environment where the server apparatus 20 is installed.

The server apparatus 30 is configured to be a common server that provides a so-called cloud service and is located in a cloud environment running in facilities owned by an external business. That is, the server apparatus 30 is an example of a second apparatus that is different from the server apparatus 20.

The server apparatuses 20 and 30 each may be physically a single computer or may be implemented by distributed processing by a plurality of computers.

More specifically, the server apparatus 20 that is outside the printer 10 and performs rasterization processing is arranged in the on premise environment in FIG. 1. However, the printer 10 does not necessarily perform rasterization processing, and the printer 10 may be configured to perform rasterization processing. In this case, since the rasterization processing is performed in the on premise environment, the printer 10 is an example of the first apparatus.

Due to growing network infrastructure, system distribution using cloud technology has become mainstream, and the productivity of digital printing may be increased by distribution. In digital printing markets, however, high-security printing using highly confidential data may need to be handled, and use of services in cloud environment might not be suitable for highly confidential data.

Thus, in this exemplary embodiment, the printer 10 that performs digital printing is connected to the server apparatus 20 in the on premise environment and the server apparatus 30 in the cloud environment. By focusing on the confidentiality of print data, the server apparatuses 20 and 30 are selectively used as a server that performs digital processing.

That is, in this exemplary embodiment, rasterization processing on print data that is recognized as having a high degree of confidentiality is performed by the server apparatus 20 in the on premise environment, and rasterization processing on print data that is recognized as not having a high degree of confidentiality is performed by the server apparatus 30 in the cloud environment.

Print data represents data containing a target on which rasterization processing is to be performed. Print data may be contained in a print job or may be held in advance in a device.

The determination as to whether print data is recognized as having a high degree of confidentiality or not having a high degree of confidentiality may be made based on a part of the print data on which rasterization processing is to be performed or may be made based on a device that holds the print data.

FIG. 2 is a functional block diagram of the printer 10. As illustrated in FIG. 2, the printer 10 includes a controller 40 that includes a print job receiving unit 41, a processing request destination determining unit 42, a print data transmitting unit 43, a rasterized image data receiving unit 44, a composite unit 45, and a display unit 46.

The controller 40 is an example of an information processing device.

The print job receiving unit 41 of the controller 40 receives a print job transmitted from a user. The print job receiving unit 41 transmits to the processing request destination determining unit 42 data necessary for the processing request destination determining unit 42 to determine a request destination.

Thus, the print job receiving unit 41 may transmit, for example, the received print job to the processing request destination determining unit 42. Furthermore, in the case where the processing request destination determining unit 42 performs a determination based on a part of print data on which rasterization processing is to be performed, the print job receiving unit 41 may transmit only print data on which rasterization processing is to be performed of a print job.

Furthermore, in the case where the processing request destination determining unit 42 performs a determination based on information about a device that holds print data, the print job receiving unit 41 may transmit information indicating the device that holds the print data. In the case where the information indicating the device is contained in the print job, the print job receiving unit 41 transmits the information. In the case where the information indicating the device is not contained in the print job, the print job receiving unit 41 acquires the information separately from the print job and transmits the acquired information.

The processing request destination determining unit 42 of the controller 40 recognizes, in accordance with a predetermined condition, the degree of confidentiality of print data on the basis of data or information transmitted from the print job receiving unit 41, and determines a request destination to which a request for rasterization processing is to be transmitted.

Recognition of the degree of confidentiality of print data may be performed based on a part of the print data on which rasterization processing is to be performed or may be performed based on a device that holds the print data. Recognizing the degree of confidentiality of print data based on a part of the print data on which rasterization processing is to be performed is an example of a condition determined for a part of print data on which rasterization processing is to be performed. Recognizing the degree of confidentiality of print data based on a device that holds the print data is an example of a condition for a device that holds print data.

The predetermined condition is an example of a predetermined condition that is a condition for recognizing the degree of confidentiality of print data.

More specifically, the processing request destination determining unit 42 determines whether the destination of a request for rasterization processing to be performed on the entire or part of print data is the server apparatus 20 (see FIG. 1) in the on premise environment or the server apparatus 30 (see FIG. 1) in the cloud environment. That is, it may be determined that a server apparatus that performs rasterization processing on the entire print data is the server apparatus 20 in the on premise environment or the server apparatus 30 in the cloud environment. Alternatively, print data may be divided into a part on which rasterization processing is to be performed by the server apparatus 20 and a part on which rasterization processing is to be performed by the server apparatus 30, and server apparatuses that are to perform rasterization processing on the individual parts may be determined.

A part on which rasterization processing is to be performed is an example of a part of print data on which rasterization processing is to be performed.

The print data transmitting unit 43 of the controller 40 transmits print data to a request destination determined by the processing request destination determining unit 42 and requests rasterization processing. That is, the print data transmitting unit 43 transmits print data to one of the server apparatus 20 and the server apparatus 30 or transmits part of print data to the server apparatus 20 and a remaining part to the server apparatus 30.

The printer 10 (see FIG. 1) is an example of an image forming apparatus.

In the case where the printer 10 includes the controller 40, the processing request destination determining unit 42 is an example of recognizing means, and the print data transmitting unit 43 is an example of first request means for requesting, for example, the server apparatus 20 to perform rasterization processing and is an example of second request means for requesting, for example, the server apparatus 30 to perform rasterization processing.

Furthermore, in the case where the printer 10 includes the controller 40 and the printing unit 12 of the printer 10 (see FIG. 1) performs rasterization processing, the printing unit 12 is an example of processing means, and the print data transmitting unit 43 of the controller 40 is an example of requesting means.

The rasterized image data receiving unit 44 of the controller 40 receives image data on which rasterization processing has been performed by the server apparatuses 20 and 30.

In the case where rasterization processing on print data is performed by only one of the server apparatuses 20 and 30, printing based on image data received by the rasterized image data receiving unit 44 is performed by the printing unit 12 (see FIG. 1).

In the case where rasterization processing is performed by the server apparatuses 20 and 30 in a divided manner, the composite unit 45 combines rasterized images together.

In the case where rasterization processing on print data is performed as distribution processing, for example, by the server apparatuses 20 and 30, the composite unit 45 of the controller 40 combines image data obtained by the server apparatus 20 and image data obtained by the server apparatus 30 together to generate image data corresponding to the print data. The printing unit 12 performs printing of the image data generated by the composite unit 45.

In this exemplary embodiment, as illustrated in FIG. 2, the controller 40 is configured to include the composite unit 45. However, the controller 40 does not necessarily include the composite unit 45. In place of the controller 40, the printer 10 may include the composite unit 45.

The display unit 46 of the controller 40 displays various types of information for a user on the display device such as a display, and receives a user operation from an input device such as a keyboard. Accordingly, the user is able to set a condition for recognizing the degree of confidentiality and check setting details.

In the case where the printer 10 includes the controller 40, the operation display unit 14 may be the display unit 46.

Part of the functional units of the controller 40 may be included in an external apparatus. For example, image data corresponding to print data is not necessarily generated by the composite unit 45 of the controller 40. In the case where reduction in the processing load such as elimination of transmission and reception processing for a rasterized image may be achieved by causing an external apparatus to generate image data corresponding to print data, the external apparatus may carry out part of the functions of the controller 40.

The functions of the controller 40 are implemented by a CPU 40A, which is an example of a processor. The CPU 40A reads a program stored in a read only memory (ROM) 40B, loads the program onto a random access memory (RAM) 40C as an operation area, and executes the program. The program to be executed by the CPU 40A may be stored in a computer-readable recording medium such as a magnetic recording medium (a magnetic tape, a magnetic disk, or the like), an optical recording medium (an optical disc or the like), a magneto-optical recording medium, or a semiconductor memory and provided to the printer 10. Furthermore, the program to be executed by the CPU 40A may be downloaded to the printer 10 through communication means such as the Internet.

The printing system 100 according to this exemplary embodiment includes the printer 10 that includes the controller 40. However, the printing system 100 is not necessarily configured as described above. For example, the controller 40 as an external apparatus may be connected to the printer 10, and the printing system 100 may be configured to include the printer 10 and the controller 40. Furthermore, the printing system 100 may be configured not to include the printer 10 but to include the controller 40 as an external apparatus connected to the printer 10.

Furthermore, in this exemplary embodiment, the controller 40 of the printer 10 is configured to include the print job receiving unit 41, the processing request destination determining unit 42, the print data transmitting unit 43, the rasterized image data receiving unit 44, the composite unit 45, and the display unit 46. However, the controller 40 is not necessarily configured as described above. An external apparatus connected to the printer 10 may include the controller 40 or the controller 40 may be configured to be an independent apparatus.

Furthermore, in this exemplary embodiment, the functions of the controller 40 are implemented by software. However, the functions of the controller 40 are not necessarily implemented by software. For example, the functions of the controller 40 may be implemented by an application specific integrated circuit (ASIC).

Next, processing examples for the case where a printing instruction based on a print job is issued will be described with reference to FIGS. 3 to 12.

Figure 10:
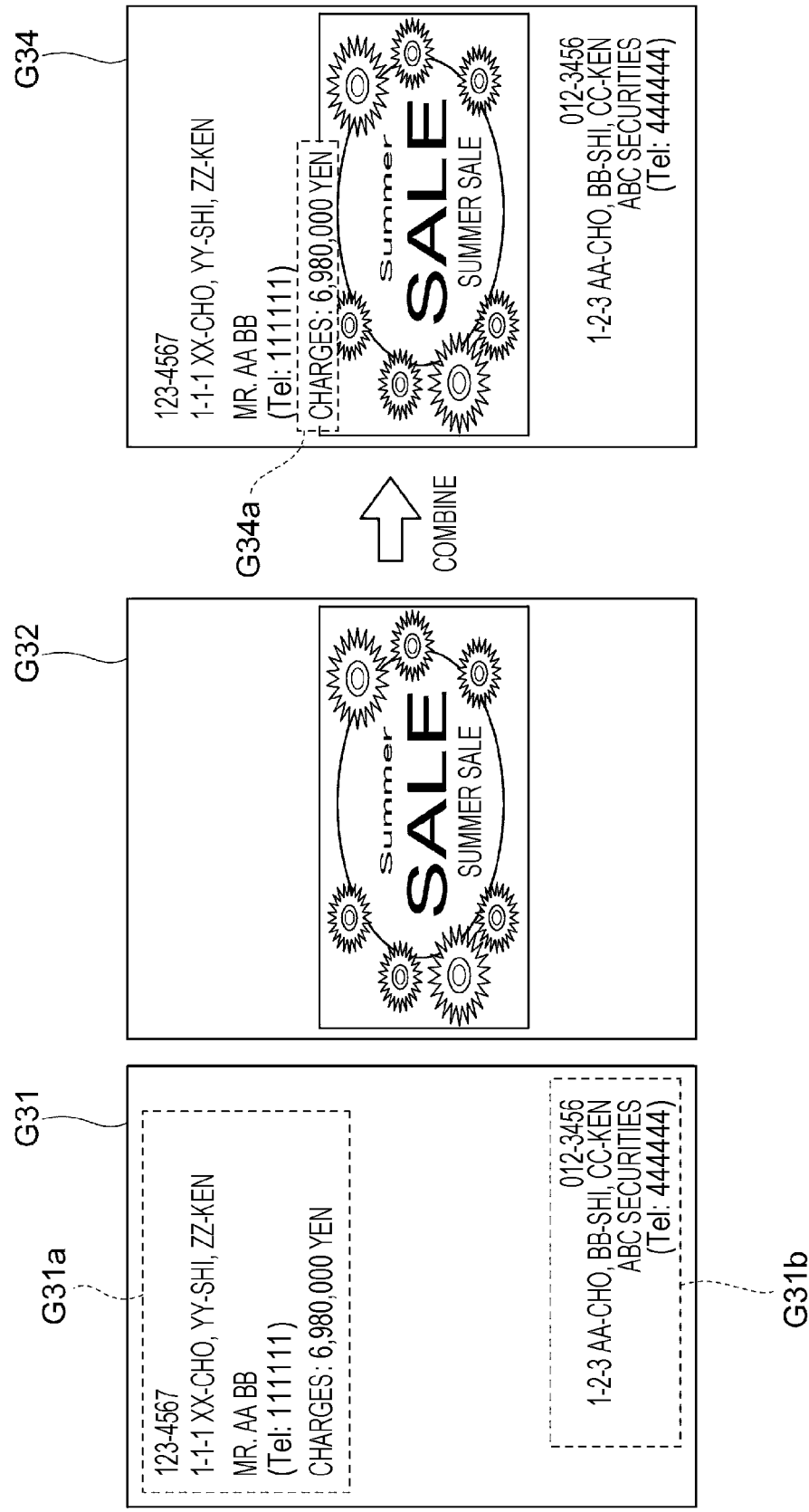
FIG. 10 is a diagram for explaining combining of rasterized images in the second example.
Figure 11:
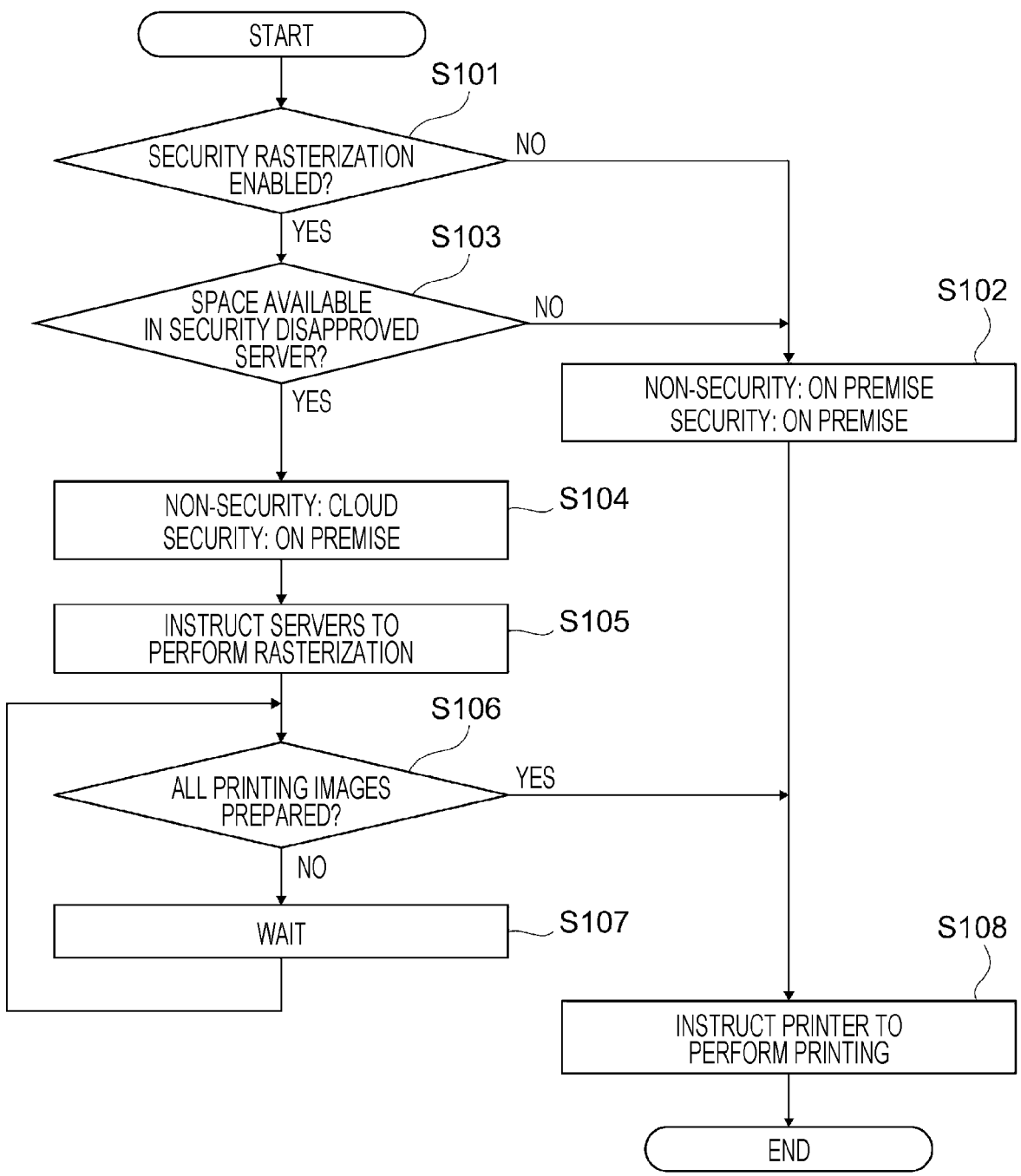
FIG. 11 is a flowchart illustrating an example of the procedure of a process in the second example.
Figure 12:
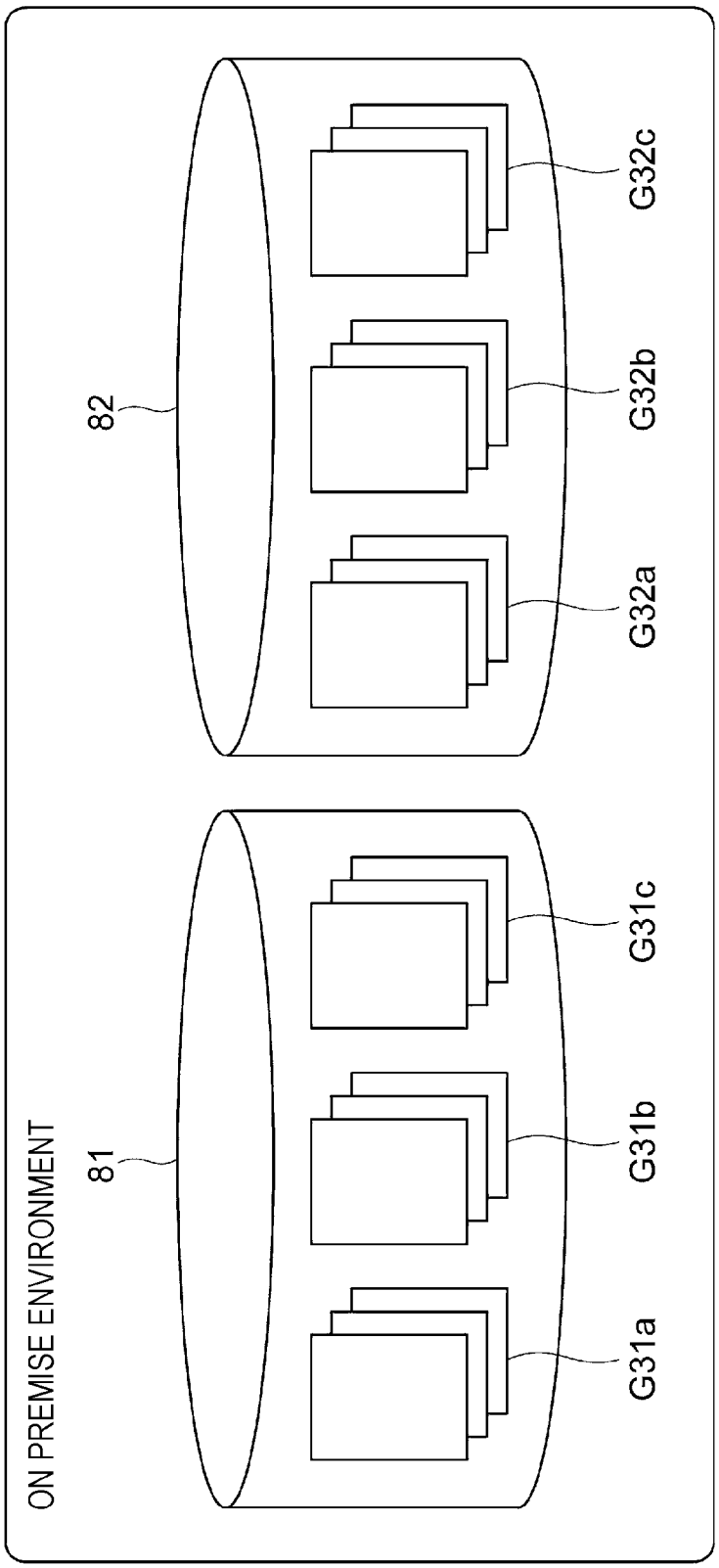
FIG. 12 is a diagram for explaining a modification in which rasterized images are stored in storage devices in an on premise environment.

FIGS. 3 to 12 are diagrams for explaining processing examples for the case where a printing instruction based on a print job is issued. FIG. 3 illustrates a first example, FIGS. 4 to 11 illustrate a second example, and FIG. 12 illustrates a modification of the first and second examples.

First Example

FIG. 3 is a diagram for explaining a first example as a processing example for the case where a printing instruction based on a print job is issued.

In the first example illustrated in FIG. 3, a main frame 50 has the functions of the controller 40 described above (see FIG. 2), and the printing unit 12 of the printer 10 performs rasterization processing in the on premise environment. The server apparatus 20 may be arranged in the on premise environment so that the server apparatus 20 is able to perform rasterization processing in the on premise environment. Furthermore, the controller 40 may be arranged outside the main frame 50.

Furthermore, the server apparatus 30 performs rasterization processing in the cloud environment.

When the print job receiving unit 41 (see FIG. 2) in the main frame 50 receives a print job from a user, the processing request destination determining unit 42 (see FIG. 2) recognizes the degree of confidentiality of character data and form data and determines a destination to which a request for rasterization processing is to be transmitted.

In the first example, the print data contained in the print job includes character data and form data. The character data is set in advance to have a relatively high security level, and the form data is set in advance to have a relatively low security level.

More specifically, the processing request destination determining unit 42 recognizes a part of the print data on which rasterization processing is to be performed that corresponds to character data as having a high degree of confidentiality, whereas recognizes a part of the print data that corresponds to form data or the like, which is not the character data, as not having a high degree of confidentiality. In other words, a part of the print data on which rasterization processing is to be performed that corresponds to image data such as form data is recognized as not having a high degree of confidentiality, whereas a part of the print data that corresponds to character data, which is not the image data, is recognized as having a high degree of confidentiality.

In the first example, the case where print data includes a part corresponding to character data and a part corresponding to form data has been described. However, the degree of confidentiality is determined in a similar manner both in the case where print data includes only character data but not form data and the case where print data includes only form data but not character data.

Character data in print data is an example of print data that is recognized as having a high degree of confidentiality, and form data in print data is an example of print data that is recognized as not having a high degree of confidentiality.

The processing request destination determining unit 42 determines that the destination of a request for rasterization processing on character data is the on premise environment, that is, the printer 10, and determines that the destination of a request for rasterization processing on form data is the cloud environment, that is, the server apparatus 30. Then, the print data transmitting unit 43 (see FIG. 2) transmits the character data to the printer 10 (step 11), and transmits the form data to the server apparatus 30 (step 12).

Accordingly, the printer 10 performs rasterization processing on the received character data to generate a character image G11 as a rasterized image. The server apparatus 30 performs rasterization processing on the received form data to generate a form image G12 as a rasterized image, and transfers the form image G12 to the main frame 50 (step 13).

The rasterized image data receiving unit 44 of the controller 40 (see FIG. 2) in the main frame 50 receives the form image G12 as a rasterized image from the server apparatus 30. In the first example, the character image G11 as a rasterized image is not transmitted to the main frame 50. Thus, the received form image G12 is transferred to the printer 10.

The printer 10 combines the character image G11 that has been generated by rasterization processing at the printer 10 with the form image G12 that has been transferred from the main frame 50 (step 14), and thus generates image data corresponding to the print data.

After that, in the printer 10, the printing unit 12 prints the image data onto a recording medium P, and the recording medium P on which the image data has been printed is ejected (step 15).

The first example illustrated in FIG. 3 represents, for example, a case where merge printing is performed using character data, which is highly confidential personal data, such as the address, name, and the like of an individual, and form data, which is less confidential data containing an image to which personal data is to be inserted. In the first example, rasterization processing on character data is performed in the high-security on premise environment, whereas rasterization processing on form data is performed in the cloud environment whose security level does not matter. Then, these images are combined together to generate image data.

Second Example

FIG. 4 is a diagram for explaining a second example as a processing example for the case where a printing instruction based on a print job is issued.

Unlike the first example illustrated in FIG. 3, which includes the on premise environment and the cloud environment, the second example illustrated in FIG. 4 includes a security approved environment and a security disapproved environment.

Furthermore, unlike the first example with a configuration in which both character data and form data are held in the main frame 50, the second example has a configuration in which data are held in different locations according to the types of data such that highly security character data is stored in a main frame 51 and less security form data is stored in a main frame 52.

Furthermore, unlike the first example with a configuration in which the controller 40 is provided inside the main frame 50, the second example has a configuration in which the controller 40 is arranged outside the main frames 51 and 52.

The second example illustrated in FIG. 4 is partially the same as the first example illustrated in FIG. 3 and explanations for steps with the same first digit number (number on the right side) in the first example and the second example are the same. Thus, the explanation for those steps may be omitted. Furthermore, images G21 and G22 in the second example correspond to the images G11 and G12 in the first example.

The second example illustrated in FIG. 4 will be described in detail.

The security approved environment in the second example is an environment that requires authentication processing for access and is an on premise environment or a private cloud environment. The private cloud environment is a cloud environment established dedicated to the company and may be an on premise environment (own type) or a hosted type (use type).

The server apparatus 20 is arranged in the security approved environment. That is, the server apparatus 20 is an example of a first apparatus that is installed in an environment that requires authentication processing for access.

Furthermore, the main frames 51 and 52 are arranged in the security approved environment. A state in which the main frames 51 and 52 are installed in an environment that requires authentication processing for access is an example of a predetermined condition.

Furthermore, the security disapproved environment in the second example is a desired environment whose security level does not matter and is an on premise environment or a public cloud environment. The public cloud environment is a cloud computing environment in an open form.

The server apparatus 30 is arranged in the security disapproved environment. That is, the server apparatus 30 is an example of a second apparatus that is different from the first apparatus.

In the second example, rasterization processing on highly confidential data and rasterization processing on less confidential data are performed in different environments. More specifically, rasterization processing on highly confidential data is performed only in the security approved environment, and rasterization processing on less confidential data is performed in the security disapproved environment as a desired environment whose security level does not matter. Thus, especially, the destination of a request for rasterization processing on less confidential data may be chosen from a wider variety.

The security approved environment and the security disapproved environment may be registered in advance, and the processing request destination determining unit 42 of the controller 40 may acquire the information registered in advance.

Unlike in the first example, a print job in the second example contains neither character data nor form data. That is, in the second example, character data identifying information for identifying character data as a printing target and form data identifying information for identifying form data as a printing target are contained in a print job.

When the print job receiving unit 41 of the controller 40 receives a print job, the processing request destination determining unit 42 acquires from the main frame 51 character data on the basis of the character data identifying information contained in the received print job and acquires from the main frame 52 form data on the basis of the form data identifying information contained in the print job.

The processing request destination determining unit 42 determines that the destination of a request for rasterization processing on the character data is the server apparatus 20 and determines the destination of a request for rasterization processing on the form data is the server apparatus 30. After that, steps 21 to 25 that correspond to steps 11 to 15 in the first example are performed.

Setting of rasterization and setting of confidential data in the second example will be described with reference to FIGS. 5 and 6.

FIG. 5 is a diagram for explaining a UI screen 61 for setting of rasterization in the second example.

The UI screen 61 for setting of rasterization illustrated in FIG. 5 is a screen on the display unit 46 (see FIG. 2) for registering in advance the security approved environment and the security disapproved environment. That is, the UI screen 61 is used for setting a destination of a request for rasterization processing determined by the processing request destination determining unit 42 and includes an item 61a "rasterize security data in distributed manner" and a check box 61b. When the check box 61b is ticked, setting is made such that distribution processing will be performed. When the check box 61b is not ticked, setting is made such that distribution processing will not be performed.

On the UI screen 61 illustrated in FIG. 5, the check box 61b is ticked, and detailed settings for distribution processing will be performed.

The UI screen 61 contains a region 61c for setting of the list of security approved servers and a region 61d for setting of the list of security disapproved servers. In each of the regions 61c and 61d, "ADD", "EDIT", and "DELETE" buttons are provided.

More specifically, in each of the regions 61c and 61d of the UI screen 61, a table containing a name column for inputting names of servers or the like and an address column for inputting IP addresses of the servers or the like is displayed.

In the name column of the region 61c, "raster-service1", "raster-service2", and "raster-service3" are input, and corresponding IP addresses are input in the address column of the region 61c. The servers or the like set here are installed in the security approved environment. For example, "raster-service1" is the main frame 51 (see FIG. 4), and "raster-service2" is the main frame 52 (see FIG. 4).

In the name column of the region 61d, "raster-public1", "raster-public2", and "raster-public3" are input, and corresponding IP addresses are input in the address column of the region 61d. The servers or the like set here are installed in the security disapproved environment.

FIG. 6 is a diagram for explaining a UI screen 62 for setting of confidential data in the second example.

The UI screen 62 for setting of confidential data illustrated in FIG. 6 is a screen on the display unit 46 (see FIG. 2) for setting in advance a condition for recognizing the degree of confidentiality. That is, the UI screen 62 contains an item 62a "determine based on print type", a check box 62b corresponding to the item 62a, an item 62d "determine based on data storage server", and a check box 62e corresponding to the item 62d. When the check box 62b is ticked, setting is made such that the degree of confidentiality is recognized according to the print type. When the check box 62e is ticked, setting is made such that the degree of confidentiality is recognized according to the data storage server. As described above, by ticking the check box 62b or 62e, setting of whether the degree of confidentiality is recognized according to the print type or according to the data storage server may be performed.

On the UI screen 62 illustrated in FIG. 6, the check box 62b is ticked. Thus, detailed settings for recognizing the degree of confidentiality may be performed according to the print type.

"ADD", "EDIT", and "DELETE" buttons are provided for the item 62a, and "ADD", "EDIT", and "DELETE" buttons are provided for the item 62d.

More specifically, in a region 62c corresponding to the item 62a, a table containing a type column for inputting a print type and a confidentiality column for specifying confidentiality is provided.

In the type column in the region 62c, three objects, "character", "image", and "tab", are input. In the confidentiality column in the region 62c, "confidential (high)" is specified for "character", "not confidential (low)" is specified for "image", and "not confidential (low)" is specified for "tab". However, in the type column in the region 62c, only "character" and "tab" may be input or only "image" and "tab" may be input.

Furthermore, in a region 62f corresponding to the item 62d, a table containing a storage server column for inputting a data storage server and a confidentiality column for specifying confidentiality is provided.

In the storage server column in the region 62f, "Server-001", "Server-002", and "Server-003" are input. In the confidentiality column in the region 62f, "confidential (high)" is specified for "Server-001", "not confidential (low)" is specified for "Server-002", and "not confidential (low)" is specified for "Server-003".

When the check box 62e is ticked, detailed settings for recognizing the degree of confidentiality according to whether the data storage server is "Server-001", "Server-002", or "Server-003" may be performed. For example, setting may be made such that the degree of confidentiality of print data held in Server-001 and the degree of confidentiality of print data held in Server-002 are different.

By causing the degrees of confidentiality to be different according to whether the data storage server is Server-001, Server-002, or Server-003 but not according to the print type such as according to whether or not the print data is character data, the degree of confidentiality may be recognized easily.

One of Server-001, Server-002, and Server-003 represents the main frame 51 and is an example of an apparatus that holds print data.

Server-001 out of Server-001, Server-002, and Server-003 is arranged in the security approved environment. Data used as print data held in Server-001 may be recognized as having a high degree of confidentiality.

In FIG. 6, as setting of confidential data, the degree of confidentiality may be set according to the print type or the data storage server. However, setting of confidential data is not necessarily performed as described above. The degree of confidentiality may be set according to the color used for printing. For example, setting may be made such that highly confidential data is printed in black and less confidential data is printed in color. Furthermore, in the case where character data contains parts with different degrees of confidentiality, for example, a part corresponding to highly confidential data may be printed in black, and a part corresponding to less confidential data may be printed in a color different from black, such as cyan.

Setting information or a user specified value set on the UI screens 61 and 62 may be held in the controller 40 and transmitted to a user terminal apparatus from which a user transmits a print job, so that the setting information as security attributes may be contained in the print job. Obviously, the setting information may be changed at the user terminal apparatus.

Furthermore, in the case where the printing system 100 includes a plurality of printers, setting information for each of the printers may be acquired in advance. Accordingly, with a configuration in which a printer 10 that performs printing is able to be selected from among a plurality of printers that have different contents of setting information, the user is able to perform selection according to the printing target.

FIGS. 7A and 7B and FIG. 8 are diagrams for explaining character data in the second example. FIGS. 7A and 7B illustrate variable data as an example. FIG. 7A illustrates character data, and FIG. 7B illustrates an image G31 based on the character data illustrated in FIG. 7A.

The character data illustrated in FIG. 7A includes variable data 71 and fixed data 72. The variable data 71 contains customer information (customer data) on the name, address, telephone number, and amount of each customer. The fixed data 72 includes company information (company data) such as the company name, address, and telephone number of the company.

More specifically, the variable data 71 is highly confidential data and is stored in the main frame 51 (see FIG. 4. Meanwhile, the fixed data 72 is less confidential data and is stored in the main frame 52 (see FIG. 4) or the like. The fixed data 72 may be stored in the security disapproved environment.

Then, rasterization processing on the variable data 71 is performed in the security approved environment (see FIG. 4), and rasterization processing on the fixed data 72 is performed in the security disapproved environment (see FIG. 4).

In the case where the image G31 illustrated in FIG. 7B is formed based on the character data illustrated in FIG. 7A, the image G31 contains a customer information region G31a in which printing is performed for each customer in the variable data 71 and a company information region G31b in which the fixed data 72 is printed. The customer information region G31a contains customer information whose contents are different among the images G31. In the company information region G31b, the same company information is printed for each image G31.

The character data illustrated in FIG. 8 is variable data 73. The variable data 73 is obtained by connecting the variable data 71 and the fixed data 72 described above. The variable data 73 includes a variable data part 73a corresponding to the variable data 71 and a fixed data part 73b corresponding to the fixed data 72.

The variable data part 73a is highly confidential data and the fixed data part 73b is less confidential data. Thus, the variable data 73 includes highly confidential data. In this exemplary embodiment, the variable data 73 is stored in the main frame 51 (see FIG. 4) but not in the main frame 52 (see FIG. 4).

Rasterization processing on the variable data 73 is performed in the security approved environment (see FIG. 4). The rasterized image formed as described above is equal to the image G31.

In the first example and the second example, an image on which rasterization processing has been performed or a rasterized image is formed on a plurality of recording media.

A rasterized image of customer information contained in the variable data 71 in the first example or the variable data part 73a in the second example will be subjected to merge printing, will not be formed in a plurality of recording media, and will be formed in a recording medium. Meanwhile, a rasterized image of company information contained in the fixed data 72 or the fixed data part 73b in the second example will be formed in a plurality of recording media. As described above, print data for a rasterized image that will not be formed in a plurality of recording media may be recognized as having a high degree of confidentiality, and print data for a rasterized image that will be formed in a plurality of recording media may be recognized as not having a high degree of confidentiality.

A state in which an image on which rasterization processing has been performed will not be formed in a plurality of recording media is an example of a predetermined condition.

An image G32 (see FIG. 9) in the first example and the second example is an example of an image on which rasterization processing has been performed.

Figure 9:
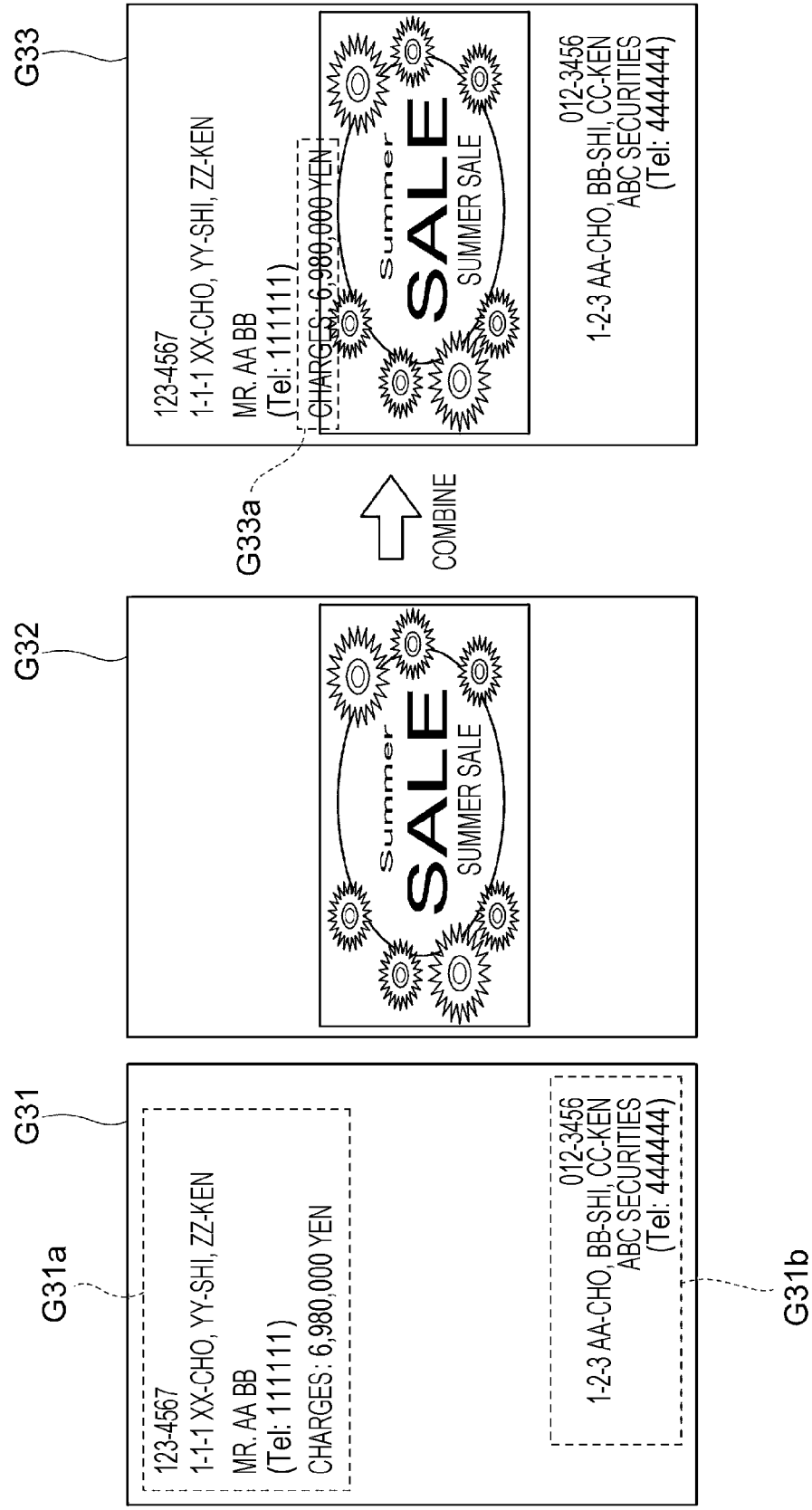
FIG. 9 is a diagram for explaining combining of rasterized images in the second example.

FIGS. 9 and 10 are diagrams for explaining combining of rasterized images in the second example. FIG. 9 illustrates an example of a combining form, and FIG. 10 illustrates another example of a combining form.

The combining form illustrated in FIG. 9 is an example of generating a composite image G33 by combining, at the composite unit 45 of the controller 40, the image G31 of character data on which rasterization processing has been performed by the server apparatus 20 (see FIG. 4) in the on premise environment with the image G32 of image data on which rasterization processing has been performed by the server apparatus 30 (see FIG. 4) in the cloud environment.

The recording medium P (see FIG. 4) is formed by printing the composite image G33.

The customer information region G31a of the image G31 partially overlaps with a decorated part of the image G32. Tus, the composite image G33 contains an overlapping part G33a.

The overlapping part G33a is a part where the customer information region G31a and the image G32 simply overlap. More specifically, the overlapping part G33a is a part where the customer information region G31a, which is an image based on secure print data, is overwritten with the image G32.

In the composite image G33, the company information region G31b and the image G32 do not overlap.

In the example of the combining form illustrated in FIG. 10, the image G31 based on character data and the image G32 based on image data are combined together, as in the example of the combining form illustrated in FIG. 9. However, in the example of the combining form illustrated in FIG. 10, a composite image G34 that is different from the composite image G33 (see FIG. 9) is formed.

That is, the composite image G34 contains an overlapping part G34a that is different from the overlapping part G33a in the composite image G33. More specifically, in the overlapping part G34a, margins are provided to the top, bottom, left, and right of the customer information region G31a, and white background processing for filling the margins in white, which is the same color as a recording medium, is performed at the time of combining. Thus, degradation of the printing quality of the overlapping part G34a in the composite image G34 is prevented compared to the printing quality of the overlapping part G33a in the composite image G33 (see FIG. 9).

Although white background processing is performed on the image G31 in FIG. 10, white background processing may be performed on the image G32.

As described above, in the case where the composite image G33 obtained by combining the image G31 on which rasterization processing has been performed by the server apparatus 20 with the image G32 on which rasterization processing has been performed by the server apparatus 30 contains the overlapping part G34a, an image around the overlapping part G34a is in the same color as that of a recording medium.

The image G31 is an example of a first rasterized image, the image G32 is an example of a second rasterized image, and the overlapping part G34a is an example of an overlapping part.

FIG. 11 is a flowchart illustrating an example of the procedure of a process in the second example.

In the example of the procedure of the process illustrated in FIG. 11, the print job receiving unit 41 of the controller 40 (see FIG. 2) receives a print job, and the processing request destination determining unit 42 (see FIG. 2) determines whether or not security rasterization is enabled (step 101).

The determination as to whether or not security rasterization is enabled is performed based on whether or not the check box 61b on the UI screen 61 for setting of rasterization (see FIG. 5) is ticked. In the case where the check box 61b is ticked, it is determined that security rasterization is enabled. In the case where the check box 61b is not ticked, it is determined that security rasterization is not enabled. As described above, the UI screen 61 is displayed by the display unit 46 (see FIG. 2).

In the case where security rasterization is not enabled (No in step 101), the processing request destination determining unit 42 determines that rasterization processing on the entire print data of a print job will be performed in the on premise environment. That is, the processing request destination determining unit 42 determines that rasterization processing on non-security print data will be performed in the on premise environment and rasterization processing on security print data will also be performed in the on premise environment (step 102), and the process proceeds to step 108.

In the case where security rasterization is enabled (Yes in step 101), it is determined whether or not there is a space available in a security disapproved server (step 103). The security disapproved server is a server displayed in the region 61*d* of the UI screen 61 (see FIG. 5).

In the case where there is no space available in the security disapproved server (No in step 103), the process proceeds to step 102. In the case where there is a space available in the security disapproved server (Yes in step 103), the processing request destination determining unit 42 determines that rasterization processing on the non-security print data will be performed in the cloud environment and rasterization processing on the security print data will be performed in the on premise environment (step 104).

The determination as to whether print data is non-security data or security data is performed based on the print type or the data storage server on the UI screen 62 for setting of confidential data described above (see FIG. 6). That is, in the case where a corresponding value in the confidentiality column is "confidential (high)", the print data is security data, and in the case where a corresponding value in the confidentiality column is "not confidential (low)", the print data is non-security data.

Next, the print data transmitting unit 43 transmits the print data to be processed to each of the determined servers and issues an instruction for rasterization processing (step 105). Accordingly, rasterization processing is performed at the server to which the instruction for rasterization processing has been transmitted.

The rasterized image data receiving unit 44 (see FIG. 2) waits for a rasterized image generated by the rasterization processing at the server. In the case where print data has been divided into a plurality of parts and rasterization processing on the print data has been performed in a distributed manner (for example, the character image G11 and the form image G12 in FIG. 3), the composite unit 45 (see FIG. 2) combines the rasterized images together to generate a printing image corresponding to the print data.

The rasterized image data receiving unit 44 determines whether or not all the printing images of the print job have been prepared (step 106). In the case where all the printing images of the print job have not been prepared (No in step 106), the rasterized image data receiving unit 44 waits until all the printing images of the print job have been prepared (step 107).

In the case where all the printing images have been prepared (Yes in step 106), if the print data has been divided into a plurality of parts and rasterization processing on the print data has been performed in a distributed manner (for example, the character image G11 and the form image G12 in FIG. 3), the composite unit 45 (see FIG. 2) combines the printing images together to generate an image corresponding to the print data.

Then, the rasterized image data receiving unit 44 instructs the printer 10 to print the printing image (step 108), and the process ends.

A modification of the first example and the second example will be described with reference to FIG. 12.

FIG. 12 is a diagram for explaining a modification in which rasterized images are stored in storage devices 81 and 82 in the on premise environment.

As illustrated in FIG. 12, the storage device 81 that stores a rasterized image G31*a* and the like on which rasterization processing has been performed in the on premise environment and the storage device 82 that stores a rasterized image G32*a* and the like on which rasterization processing has been performed in the cloud are arranged in the on premise environment.

The rasterized image G31*a* stored in the storage device 81 and the rasterized image G32*a* stored in the storage device 82 are based on a print job JBa and are combined together and printed. A rasterized image G31*b* stored in the storage device 81 and a rasterized image G32*b* stored in the storage device 82 are based on a print job JBb and are combined together and printed. Furthermore, a rasterized image G31*c* stored in the storage device 81 and a rasterized image G32*c* stored in the storage device 82 are based on a print job JBc and are combined together and printed.

In the storage device 81, job numbers and sheet numbers (page numbers) are managed for the individual rasterized images G31*a* to G31*c*. In the storage device 82, job numbers and sheet numbers (page numbers) are managed for the individual rasterized images G32*a* to G32*c*. Thus, in each of the storage devices 81 and 82, it may be confirmed that a rasterized image with which job number and which sheet number is stored.

As described above, rasterized images on which rasterization processing has been performed in the on premise environment or the cloud environment are stored in the storage device 81 or 82 according to whether they have been rasterized in the on premise environment or in the cloud environment. Then, the rasterized images are printed by the printer 10 in the order of print jobs that satisfy a printing condition.

Due to distribution of rasterization processing or the like, it may be assumed that the order in which rasterization processing is completed is different from the order in which print jobs are received. By storing rasterized images in advance in the storage devices 81 and 82 and printing the rasterized images in the order in which a printing condition is satisfied, the productivity of printing may be increased.

The printing condition may be set on a UI screen by a user.

The printing condition may be set such that, for example, all the images with the same job number are stored in both the storage devices 81 and 82. In this case, job unit printing for printing images with the same job number in the order of sheet numbers is performed, and sheets of paper are ejected in the order of sheet numbers.

Furthermore, the printing condition may be set such that images with the same job number and the same sheet number are stored in both the storage devices 81 and 82. For example, in the case where images with the same job number and the same sheet number, such as sheet number 2, are stored in both the storage devices 81 and 82, the images with the sheet number 2 are printed prior to an image with sheet number 1 and a sheet of paper on which the images with the sheet number 2 has been printed is ejected.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
recognize, based on a predetermined condition, a degree of confidentiality of acquired print data;
request a first apparatus that is installed in an internal environment in which the first apparatus is installed or that is installed in an environment that requires authentication processing for access to perform rasterization processing on print data that is recognized as having a high degree of confidentiality; and
request a second apparatus, which is different from the first apparatus, to perform rasterization processing on print data that is recognized as not having a high degree of confidentiality.

2. The information processing device according to claim 1, wherein the predetermined condition, which is a condition for recognizing the degree of confidentiality, is a condition determined for a part of the print data on which rasterization processing is to be performed.

3. The information processing device according to claim 2,
wherein the predetermined condition is that the part of the print data on which rasterization processing is to be performed is character data,
wherein in a case where the part of the print data on which rasterization processing is to be performed is character data, the degree of confidentiality of the part of the print data is recognized as being high, and
wherein in a case where the part of the print data on which rasterization processing is to be performed is not character data, the degree of confidentiality of the part of the print data is recognized as not being high.

4. The information processing device according to claim 2,
wherein the predetermined condition is that the part of the print data on which rasterization processing is to be performed is image data,
wherein in a case where the part of the print data on which rasterization processing is to be performed is image data, the degree of confidentiality of the part of the print data is recognized as not being high, and
wherein in a case where the part of the print data on which rasterization processing is to be performed is not image data, the degree of confidentiality of the part of the print data is recognized as being high.

5. The information processing device according to claim 2,
wherein the predetermined condition is that an image on which rasterization processing has been performed is not formed on a plurality of recording media,
wherein in a case where an image on which rasterization processing has been performed is not formed on a plurality of recording media, the degree of confidentiality of the image is recognized as being high, and
wherein in a case where an image on which rasterization processing has been performed is formed on a plurality of recording media, the degree of confidentiality of the image is recognized as not being high.

6. The information processing device according to claim 1, wherein the predetermined condition, which is a condition for recognizing the degree of confidentiality, is about an apparatus that holds the print data.

7. The information processing device according to claim 6, wherein the predetermined condition is that the apparatus that holds the print data is installed in the environment that requires authentication processing for access.

8. The information processing device according to claim 1, wherein in a case where a composite image obtained by combining a first rasterized image, which is an on which rasterization processing has been performed by the first apparatus, with a second rasterized image, which is an image on which rasterization processing has been performed by the second apparatus, contains an overlapping part, an image around the overlapping part in one of the first rasterized image and the second rasterized image is in the same color as a color of a recording medium.

9. A printing system configured to:
recognize, based on a predetermined condition, a degree of confidentiality of acquired print data;
request a first apparatus that is installed in an internal environment in which the first apparatus is installed or that is installed in an environment that requires authentication processing for access to perform rasterization processing on print data that is recognized as having a high degree of confidentiality; and
request a second apparatus, which is different from the first apparatus, to perform rasterization processing on print data that is recognized as not having a high degree of confidentiality.

10. The printing system according to claim 9, wherein the predetermined condition, which is a condition for recognizing the degree of confidentiality, is a condition determined for a part of the print data on which rasterization processing is to be performed.

11. The printing system according to claim 10,
wherein the predetermined condition is that the part of the print data on which rasterization processing is to be performed is character data,
wherein in a case where the part of the print data on which rasterization processing is to be performed is character data, the degree of confidentiality of the part of the print data is recognized as being high, and
wherein in a case where the part of the print data on which rasterization processing is to be performed is not character data, the degree of confidentiality of the part of the print data is recognized as not being high.

12. The printing system according to claim 10,
wherein the predetermined condition is that the part of the print data on which rasterization processing is to be performed is image data,
wherein in a case where the part of the print data on which rasterization processing is to be performed is image data, the degree of confidentiality of the part of the print data is recognized as not being high, and
wherein in a case where the part of the print data on which rasterization processing is to be performed is not image data, the degree of confidentiality of the part of the print data is recognized as being high.

13. A non-transitory computer readable medium storing a program causing a computer to execute a process comprising:
recognizing, based on a predetermined condition, a degree of confidentiality of acquired print data;
requesting a first apparatus that is installed in an internal environment in which the first apparatus is installed or that is installed in an environment that requires authentication processing for access to perform rasterization processing on print data that is recognized as having a high degree of confidentiality; and
requesting a second apparatus, which is different from the first apparatus, to perform rasterization processing on print data that is recognized as not having a high degree of confidentiality.

14. The non-transitory computer readable medium according to claim 13, wherein the predetermined condition, which is a condition for recognizing the degree of confidentiality, is a condition determined for a part of the print data on which rasterization processing is to be performed.

15. The non-transitory computer readable medium according to claim 14,
wherein the predetermined condition is that the part of the print data on which rasterization processing is to be performed is character data,
wherein in a case where the part of the print data on which rasterization processing is to be performed is character data, the degree of confidentiality of the part of the print data is recognized as being high, and
wherein in a case where the part of the print data on which rasterization processing is to be performed is not character data, the degree of confidentiality of the part of the print data is recognized as not being high.

16. The non-transitory computer readable medium according to claim 14,
wherein the predetermined condition is that the part of the print data on which rasterization processing is to be performed is image data,
wherein in a case where the part of the print data on which rasterization processing is to be performed is image data, the degree of confidentiality of the part of the print data is recognized as not being high, and
wherein in a case where the part of the print data on which rasterization processing is to be performed is not image data, the degree of confidentiality of the part of the print data is recognized as being high.

17. The non-transitory computer readable medium according to claim 14,
wherein the predetermined condition is that an image on which rasterization processing has been performed is not formed on a plurality of recording media,
wherein in a case where an image on which rasterization processing has been performed is not formed on a plurality of recording media, the degree of confidentiality of the image is recognized as being high, and
wherein in a case where an image on which rasterization processing has been performed is formed on a plurality of recording media, the degree of confidentiality of the image is recognized as not being high.

18. The non-transitory computer readable medium according to claim 13, wherein the predetermined condition, which is a condition for recognizing the degree of confidentiality, is about an apparatus that holds the print data.

19. The non-transitory computer readable medium according to claim 18, wherein the predetermined condition is that the apparatus that holds the print data is installed in the environment that requires authentication processing for access.

20. The non-transitory computer readable medium according to claim 13, wherein in a case where a composite image obtained by combining a first rasterized image, which is an on which rasterization processing has been performed by the first apparatus, with a second rasterized image, which is an image on which rasterization processing has been performed by the second apparatus, contains an overlapping part, an image around the overlapping part in one of the first rasterized image and the second rasterized image is in the same color as a color of a recording medium.

* * * * *